(12) United States Patent
Jang et al.

(10) Patent No.: US 10,431,169 B2
(45) Date of Patent: *Oct. 1, 2019

(54) DISPLAY DEVICE

(71) Applicant: SAMSUNG DISPLAY CO., LTD., Yongin-si, Gyeonggi-Do (KR)

(72) Inventors: Jinwon Jang, Asan-si (KR); Wonhyoung Kang, Asan-si (KR); Daesik Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,047

(22) Filed: Jan. 12, 2018

(65) Prior Publication Data

US 2018/0137826 A1    May 17, 2018

Related U.S. Application Data

(63) Continuation of application No. 14/880,960, filed on Oct. 12, 2015, now Pat. No. 9,898,975.

(30) Foreign Application Priority Data

Oct. 21, 2014   (KR) .................. 10-2014-0142555

(51) Int. Cl.
```
G09G 3/36      (2006.01)
F21V 23/00     (2015.01)
G02F 1/1333    (2006.01)
G02F 1/1345    (2006.01)
G09G 3/34      (2006.01)
```

(52) U.S. Cl.
CPC ............. *G09G 3/36* (2013.01); *F21V 23/001* (2013.01); *G02F 1/13452* (2013.01); *G02F 1/133305* (2013.01); *G02F 1/133308* (2013.01); *G09G 3/342* (2013.01); *G09G 2330/00* (2013.01)

(58) Field of Classification Search
CPC ........ G09G 3/36; G09G 3/342; G09G 3/3426; G09G 2330/00; G02F 1/133305; G02F 1/133308; G02F 1/13452; G02F 1/133602; G02F 1/133603; G02F 1/133604; F21V 23/001; F21V 23/002
See application file for complete search history.

(56) References Cited

U.S. PATENT DOCUMENTS

| | | |
|---|---|---|
| 7,609,355 B2 | 10/2009 | Nouchi et al. |
| 7,667,786 B2 | 2/2010 | Nouchi et al. |
| 7,903,196 B2 | 3/2011 | Koganezawa |
| 9,324,253 B2 | 4/2016 | Whitehead et al. |

(Continued)

FOREIGN PATENT DOCUMENTS

| | | |
|---|---|---|
| KR | 10-0703185 | 3/2007 |
| KR | 10-2012-0047390 | 5/2012 |

(Continued)

*Primary Examiner* — Alan B Cariaso
(74) *Attorney, Agent, or Firm* — Innovation Counsel LLP

(57) ABSTRACT

A display device includes: a curved display panel; at least one light source module configured to provide light to the display panel; a bottom case configured to accommodate the light source module; and at least one signal transmission unit connected to an end portion of the light source module, the signal transmission unit including at least one driving line transmitting a driving signal to the light source module and at least one base line transmitting a base signal.

16 Claims, 8 Drawing Sheets

(56) References Cited

U.S. PATENT DOCUMENTS

| | | |
|---|---|---|
| 9,423,113 B2 | 8/2016 | Myers et al. |
| 9,625,131 B2 | 4/2017 | Kim |
| 9,898,975 B2 * | 2/2018 | Jang ................. G02F 1/133305 |
| 2010/0245708 A1 | 9/2010 | Baba et al. |
| 2010/0265694 A1 | 10/2010 | Kim et al. |
| 2014/0133073 A1 | 5/2014 | Ahn et al. |

FOREIGN PATENT DOCUMENTS

| | | |
|---|---|---|
| KR | 10-2013-0068398 | 6/2013 |
| KR | 10-2014-0060078 | 5/2014 |

* cited by examiner

DISPLAY DEVICE

CROSS-REFERENCE TO RELATED APPLICATION

This application is a continuation application of U.S. patent application Ser. No. 14/880,960 filed on Oct. 12, 2015, which claims priority to Korean Patent Application No. 10-2014-0142555, filed on Oct. 21, 2014 in the Korean Intellectual Property Office (KIPO), and all the benefits accruing therefrom under 35 U.S.C. § 119, the contents of the prior applications being herein incorporated by reference.

BACKGROUND

1. Field

Embodiments of the present inventive concept relate to a display device capable of facilitating wiring processes between a light source module and a power supply configured to apply driving signals to the light source module.

2. Description of the Related Art

A liquid crystal display (LCD) device is a type of flat panel displays (FPDs), which is most widely used these days. An LCD device includes two substrates including electrodes formed thereon and a liquid crystal layer interposed therebetween. Upon applying voltage to two electrodes, liquid crystal molecules of the liquid crystal layer are rearranged, thereby adjusting an amount of transmitted light.

Such an LCD device may include a backlight unit. The backlight units may be categorized into a direct type, an edge type, a corner type, and the like according to a position of the light source.

In recent years, a light emitting diode (LED), which is characterized by low power consumption and high efficiency, is usually used as a light source of a backlight unit.

Further, a light source module including a plurality of LEDs mounted on a printed circuit board (PCB) may be used for the backlight unit.

The light source module may receive driving signals from an external power supply and may emit light. For this purpose, wires may be disposed between the light source module and the power supply to connect therebetween.

The direct-type backlight unit may include a large number of light source modules, and thus more wires may be disposed between the light source modules and the power supply.

In particular, a curved-type display device having such a direct-type backlight unit may include, compared to a general display device, more light source modules. This is mainly because the curved-type display devices are mostly provided in a quadrangular shape and curved along the longitudinal direction of a long side of the quadrangular shape, which is described below in detail.

That is, when the light source modules are arranged along the longitudinal direction of a short side of the curved-type display device, it is advantageous in that less light source modules are required. In this case, however, the light source modules may be curved, which incurs unstable operation of the light source modules. Accordingly, light source modules used for conventional curved-type display devices are arranged along the longitudinal direction of the long side of the display device. In such cases, the longitudinal direction of each light source module may correspond to the longitudinal direction of the short side which is not curved, such that the light source modules may not be curved. However, due to such structure, the conventional curved-type display device may require more light source modules. Accordingly, in the conventional curved-type display device, wirings between the light source modules and the power supply may become disadvantageously complicated.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the present inventive concept are directed to a display device capable of facilitating wiring processes between light source modules and a power supply.

According to an exemplary embodiment of the present inventive concept, a display device includes: a curved display panel; at least one light source module configured to provide light to the display panel; a bottom case configured to accommodate the light source module; and at least one signal transmission unit connected to an end portion of the light source module, the signal transmission unit including at least one driving line transmitting a driving signal to the light source module and at least one base line transmitting a base signal.

The signal transmission unit may be a flexible printed circuit.

The signal transmission unit may include: an input pad unit respectively connected to an end portion of the driving line and an end portion of the base line and configured to receive a driving signal outputted from a power supply; and an output pad unit respectively connected to another end portion of the driving line, an end portion of a branch line branching off from the base line, and the light source module.

The signal transmission unit may further include an insulating layer between the driving line and the branch line.

The display device may further include a connector configured to connect the output pad unit and the light source module.

The driving line may have a plurality of driving lines, a driving line farther away from the input pad unit has a greater line width than that close to the input pad unit.

The branch line has a plurality of branch lines, a branch line farther away from the input pad unit has a greater line width than that close to the input pad unit.

Each of the light source modules may include: a light source array including at least one light source configured to emit light; a first transmission line configured to supply a driving signal applied from one of the output pad units to one side of the light source array; a second transmission line configured to supply a base signal applied from one of the output pad units to another side of the light source array; a pad unit on which an end portion of the first transmission line and an end portion of the second transmission line are disposed; and a body unit on which a remaining portion of the first and second transmission lines, excluding the end portion of the first transmission line and the end portion of the second transmission line, and the light source array are disposed.

The first transmission line has a plurality of first transmission lines, a transmission line farther away from the input pad unit has a greater line width than that close to the input pad unit.

The signal transmission unit may be disposed between the light source modules and one side portion of the bottom case.

The signal transmission unit may be attached to a base portion of the bottom case.

The display device may further include an adhesive member disposed between the signal transmission unit and the base portion of the bottom case.

The bottom case may have a connecting hole through which the input pad unit of the signal transmission unit is exposed.

The plurality of driving lines and at least one base line are disposed on a same layer in the signal transmission unit.

The plurality of light source modules comprise the first transmission lines having a same width or the second transmission lines having a same width.

According to embodiments of the present inventive concept, a display device may have the following effects.

First, according to embodiments of the present inventive concept, a signal transmission unit including driving lines may function as wirings between light source modules and a power supply. Accordingly, the wiring between the light source modules and the power supply may be facilitated, thereby capable of reducing time for wiring processes.

Second, according to embodiments of the present inventive concept, light source modules disposed farther from an input pad unit may be connected to a driving line having a greater line width. Accordingly, deviation between driving signals applied to the light source modules may be reduced.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of inventive concept will be more clearly understood from the following detailed description taken in conjunction with the accompanying drawings, in which.

DETAILED DESCRIPTION

Figure 1:
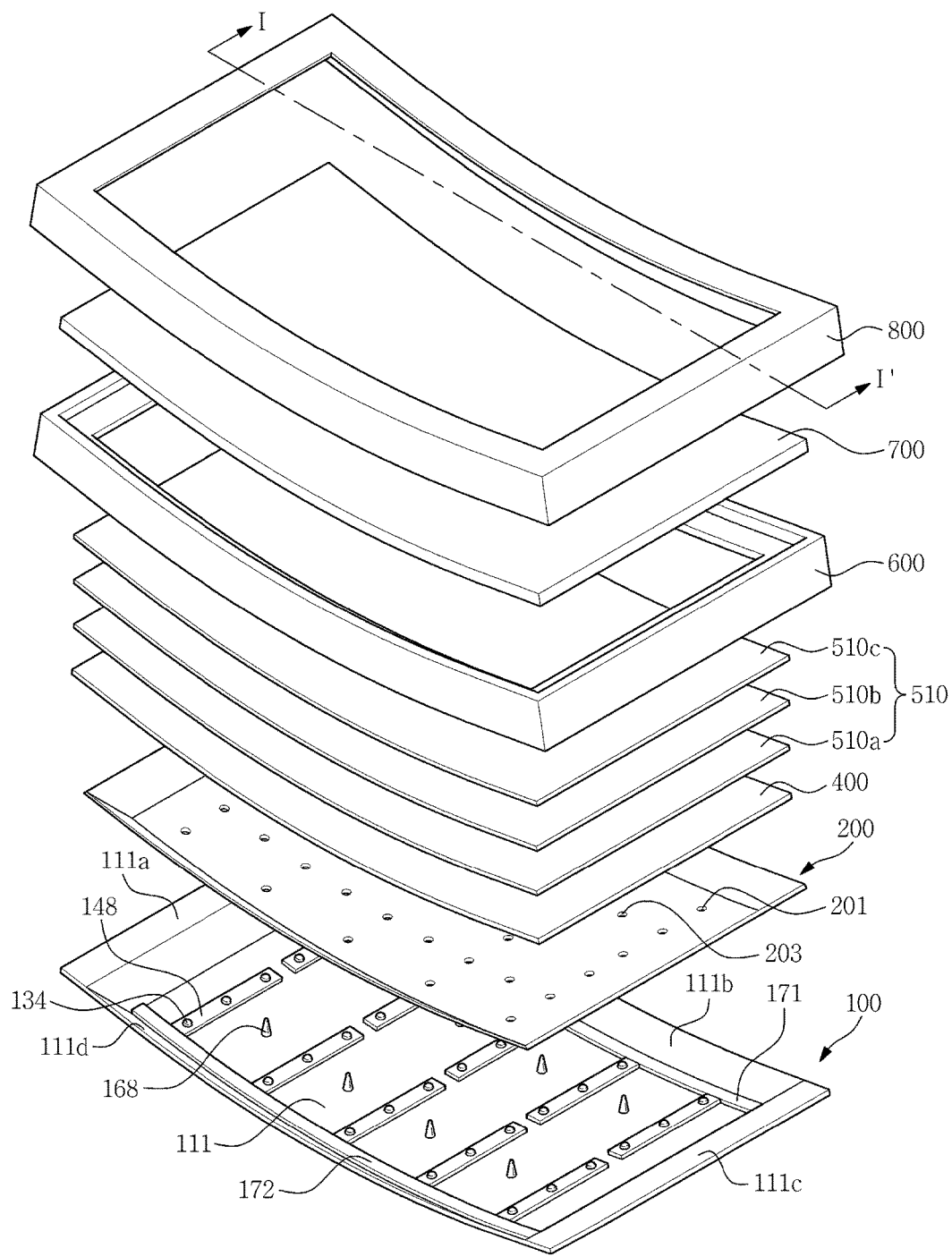
FIG. 1 is an exploded perspective view illustrating a display device according to an exemplary embodiment.

Advantages and features of the present inventive concept and methods for achieving them will be made clear from embodiments described below in detail with reference to the accompanying drawings. The present inventive concept may, however, be embodied in many different forms and should not be construed as being limited to the embodiments set forth herein. Rather, these embodiments are provided so that this disclosure will be thorough and complete, and will fully convey the scope of the inventive concept to those skilled in the art. The present inventive concept is merely defined by the scope of the claims. Therefore, well-known constituent elements, operations and techniques are not described in detail in the embodiments in order to prevent the present inventive concept from being obscurely interpreted. Like reference numerals refer to like elements throughout the specification.

In the drawings, the thickness of layers and regions may be exaggerated for clarity. In addition, when a layer is described to be formed on another layer or on a substrate, this means that the layer may be formed on the other layer or on the substrate, or a third layer may be interposed between the layer and the other layer or the substrate. It will be understood that when an element such as a layer, film, region, or substrate is referred to as being "on" another element, it can be directly on the other element or intervening elements may also be present between the element and the another element. In contrast, when an element is referred to as being "directly on" another element, there are no intervening elements present.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device disposed "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this inventive concept pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2:
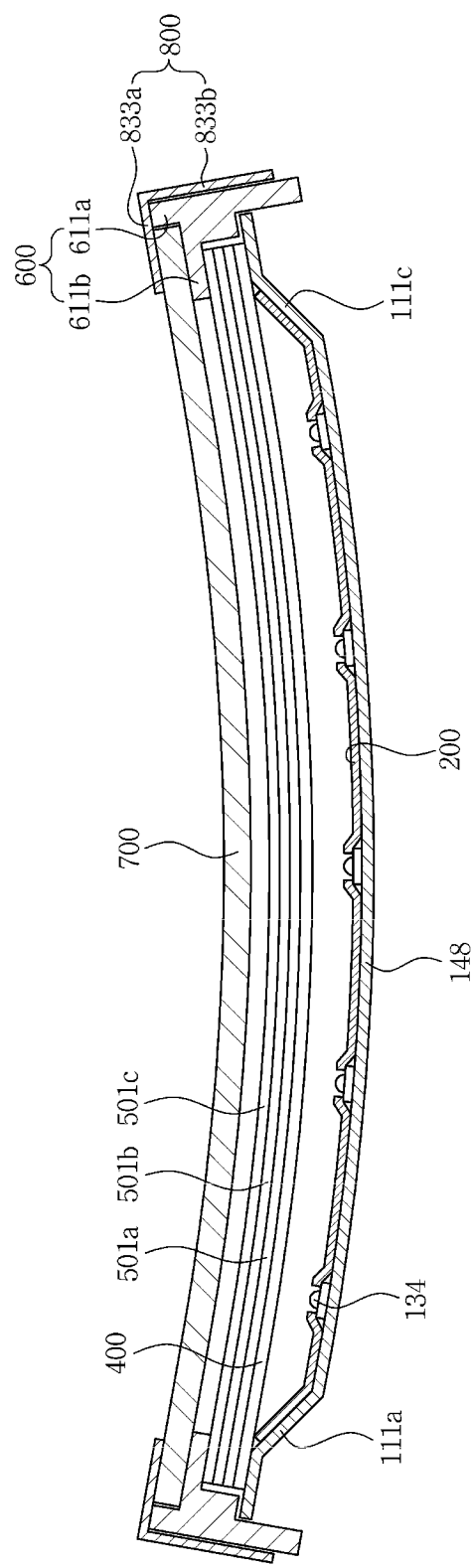
FIG. 2 is a cross-sectional view taken along line I-I' of FIG. 1.

FIG. 1 is an exploded perspective view illustrating a display device according to an exemplary embodiment and FIG. 2 is a cross-sectional view taken along line I-I' of FIG. 1.

The display device according to an exemplary embodiment is a curved-type display device in which both sides are roundly curved with respect to the center portion of a display area. Hereinafter, unless described otherwise, all elements may include bendable materials.

The display device according to an exemplary embodiment may include, as described in FIG. 1, a bottom case 100, a light source module 148, a reflection plate 200, a diffusion plate 400, an optical sheet 510, a mold frame 600, a display panel 700, and a top case 800. Of the above-listed elements, the diffusion plate 400, the optical sheet 510, the mold frame 600, the display panel 700 and the top case 800 may have a roundly curved form.

The bottom case 100 may have an accommodation area therein. In the accommodation area, the plurality of light source modules 148, a plurality of support means 168 and the reflection plate 200 may be disposed. To secure the accommodation area, the bottom case 100 may include a base portion 111 and a plurality of side portions 111a, 111b, 111c, and 111d.

The base portion 111 may have a quadrangular shape in which both sides are roundly curved with respect to the center portion.

Each of the first, second, third, and fourth side portions 111a, 111b, 111c, and 111d may protrude from the respective edge portions of the base portion 111 to have a predetermined height. Edge portions of adjacent side portions 111b may be connected to each other. A space surrounded by the first, second, third, and fourth side portions 111a, 111b, 111c, and 111d and the base portion 111 refers to the accommodation area.

Locking protrusions 635 may be respectively disposed on the first and third side portions 111a and 111c opposed to each other. The mold frame 600 may be fixed to the bottom case 100 by the locking protrusions 635. The first and third side portions 111a and 111c may partially protrude toward inner surfaces of the mold frame 600, thereby forming locking protrusions 635 having a hook form.

The second and fourth side portions 111b and 111d may have a curved form in which both sides are roundly curved with respect to the respective center portion.

The light source modules 148 may generate light. The light source modules 148 may be disposed on the base portion 111 of the bottom case 100. Herein, the light source modules 148 may be categorized into two groups. In detail, a plurality of light source modules 148 disposed between the center portion of the base portion 111 and the second side portion 111b are defined as light source modules of a first group; and a plurality of light source modules 148 disposed between the center portion of the base portion 111 and the fourth side portion 111d are defined as light source modules of a second group.

The light source modules of the first group may be electrically connected to the first signal transmission unit 171, while those of the second group may be electrically connected to the second signal transmission unit 172.

Light sources 134 provided in the light source modules 148 may be at least partially exposed over the reflection plate 200 through a through hole 201 extending through the reflection plate 200.

The first signal transmission unit 171 may be disposed on the base portion 111. In detail, the first signal transmission unit 171 may be disposed between the light source modules of the first group and the second side portion 111b. The first signal transmission unit 171 may have a curved form in which both sides are roundly curved with respect to the center portion. An adhesive member (not illustrated) may be further provided between the first signal transmission unit 171 and the base portion 111. The first signal transmission unit 171 may be fixed to the base portion 111 by the adhesive member.

The first signal transmission unit 171 may transmit a plurality of driving signals and at least one base signal outputted from an external power supply (not illustrated) to the light source modules of the first group. The first signal transmission unit 171 may be, for instance, a flexible printed circuit.

The second signal transmission unit 172 may be provided on the base portion 111. In detail, the second signal transmission unit 172 may be disposed between the light source modules of the second group and the fourth side portion 111d. The second signal transmission unit 172 may have a curved form in which both sides are roundly curved with respect to the center portion. An adhesive member (not illustrated) may be further provided between the second signal transmission unit 172 and the base portion 111. The second signal transmission unit 172 may be fixed to the base portion 111 by the adhesive member.

The second signal transmission unit 172 may transmit a plurality of driving signals and at least one base signal outputted from the above-described external power supply to the light source modules of the second group. The second signal transmission unit 172 may be, for instance, a flexible printed circuit.

The plurality of driving signals and at least one base signal outputted from the power supply to the first signal transmission unit 171 may be different from the plurality of driving signals and at least one base signal outputted from the power supply to the second signal transmission unit 172, respectively.

Both of the driving signals and the base signal may be voltage signal. In this case, the driving signals may have greater voltage than the base signal. The driving signals may respectively have different voltage levels. Meanwhile, the base signal may have a zero voltage.

The reflection plate 200 may reflect light emitted from the light source modules 148 to the display panel 700. The reflection plate 200 may be disposed between the bottom case 100 and the diffusion plate 400.

The diffusion plate 400 may be disposed on the reflection plate 200. The diffusion plate 400 is configured to obtain uniform luminance distribution of light emitted from the light source module 148 and provide the light to the optical sheet 510.

At least one support means 168 may be disposed under the diffusion plate 400 to support the diffusion plate 400. The support means 168 may be disposed on the base portion 111. The support means 168 may be exposed over the reflection plate 200 through a through-hole 203 of the reflection plate 200 disposed thereon.

The optical sheet 510 is configured to diffuse and/or collimate the light directed from the diffusion plate 400. The optical sheet 510 may be disposed, as illustrated in FIG. 1, between the diffusion plate 400 and the display panel 700. The optical sheet 510 may include a diffusion sheet 510a, a prism sheet 510b, and a protection sheet 510c. The diffusion sheet 510a, the prism sheet 510b and the protection sheet 510c may be sequentially laminated on the diffusion plate 400 in the order listed.

The diffusion sheet 510a may diffuse light directed from the diffusion plate 400 and may reduce or prevent the light from being partly concentrated.

The prism sheet 510b may be disposed on the diffusion sheet 510a and may collimate light diffused from the diffusion sheet 510a in a direction perpendicular to the display panel 700. For this purpose, prisms having a triangular cross-section may be disposed in a predetermined array on one surface of the prism sheet 510b.

The protection sheet 510c may be disposed on the prism sheet 510b, may protect a surface of the prism sheet 510b, and may diffuse light to achieve equally distributed light. The light leaving the protection sheet 510c may be guided to the display panel 700.

The mold frame 600 may be fixed to the bottom case 100. Further, the mold frame 600 may support the display panel 700 and the top case 800, and may maintain gaps between the display panel 700 and the optical sheet 510 to be constant. For this purpose, the mold frame 600 may have a quadrangular frame shape including first and second supports 611a and 611b.

The first support 611a may be disposed on the first, second, third, and fourth side portions 111a, 111b, 111c, and 111d and may support the top case 800 disposed on the first support 611a. An inserting hole 640 may be formed on the first support 611a to allow the locking protrusion 635 of the first and third side portions 111a and 111c to be inserted.

The second support 611b may extend from an inner edge portion of the first support 611a to a space between the optical sheet 510 and the display panel 700. The second support 611b may have a height shorter than the first support 611a. Due to the height difference between the second support 611b and the first support 611a, a space may be secured between the top case 800 and the second support 611b. An edge portion of the display panel 700 may be disposed in the space.

The display panel 700 is configured to display images. The display panel 700 may be divided into a display area and a non-display area. An image is displayed on the display area and signal lines for transmitting image data, various control signals, and various power signals required to display the image may be disposed on the non-display area. Further, a driving circuit unit configured to provide the image data, the various control signals, and the various power signals may be further provided, partially or entirely, on the non-display area or on the above-described driving circuit board.

The display panel 700 according to the present inventive concept may be an LCD panel, but is not limited thereto. In addition to the LCD panel, any panel-type structures that may display images by receiving light from the backlight unit may be utilized.

The top case 800 may have a quadrangular-frame form that covers the non-display area including an edge portion of a front surface of the display panel 700. The top case 800 may surround an upper surface and a lateral surface of the first support 311a of the mold frame 600. For this purpose, the top case 800 may include an upper cover 833a configured to cover the upper surface of the first support 611a and a side cover 833b configured to cover the lateral surface of the first support 611a. Meanwhile, although not illustrated, a hook may be provided inside the side cover 833b. The hook may be in contact with a lower surface of a fixing member provided in the mold frame 600. The top case 800 may be fixed to the mold frame 600 by the hook.

Hereinafter, the first signal transmission unit 171 will be described in detail with reference to FIG. 3.

Figure 3:
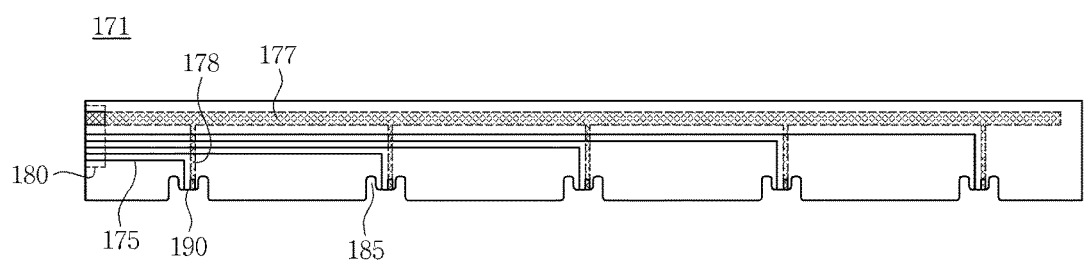
FIG. 3 is a detailed configuration view illustrating a first signal transmission unit of FIG. 1.

FIG. 3 is a detailed configuration view illustrating the first signal transmission unit in FIG. 1.

The first signal transmission unit 171 may include, as illustrated in FIG. 3, an input pad unit 180, a plurality of output pad units 190, a plurality of driving lines 175, and a base line 177. Meanwhile, the first signal transmission unit 171 may further include a plurality of branch lines 178 branching off from the base line 177. The branch lines 178 may intersect at least one driving line 175. The branch lines 178 may be connected to the base line 177. Herein, when a base signal has a zero voltage, the base line 177 may be grounded.

An end portion of each of the plurality of driving line 175 and an end portion of the base line 177 may be disposed on the input pad unit 180. Driving signals and a base signal provided from the power supply may be applied to the input pad unit 180. That is, the driving signals applied to the input pad unit 180 may be respectively applied to an end portion of each of the driving lines 175. Further, the base signal applied to the input pad unit 180 may be applied to an end portion of the base line 177.

Another end portion of each of the plurality of driving lines 175 and end portions of the branch lines 178 may be disposed on the output pad unit 190.

The first signal transmission unit 171 may further include an insulation layer (not illustrated) disposed between the driving lines 175 and the branch lines 178. That is, the driving line 175 and the branch line 178 may be disposed on different layers, respectively, in the first signal transmission unit 171. For example, the driving lines 175 may be disposed on the insulation layer and the branch lines 178 and the base line 177 may be disposed under the insulation layer. In this case, an end portion of the base line 177 disposed on the input pad unit 180 and the end portions of the branch lines 178 disposed on the output pad units 190 may be exposed outwards through through-holes extending through the insulation layer.

Meanwhile, although not illustrated, the driving lines 175 and the branch lines 178 may be disposed on the same layer in the first signal transmission unit 171. In this case, the driving lines 175 may not intersect the branch lines 178.

Further, although not illustrated, the driving lines 175 may be disposed on one side surface of the first signal transmission unit 171, and the branch lines 178 may be disposed on another side surface of the first signal transmission unit 171. The another side surface of the first signal transmission unit 171 may oppose the one surface thereof.

The first signal transmission unit 171 may further have inserting grooves 185 respectively disposed at both sides of the output pad unit 190. The light source modules of the first group may be inserted into the first signal transmission unit 171 through these inserting grooves 185.

According to the present exemplary embodiment, the first signal transmission unit 171 including the driving lines 175 may be disposed between the light source modules of the first group and the power supply. Accordingly, the wirings between the light source modules of the first group and the power supply may be facilitated.

Meanwhile, at least two of the plurality of driving lines 175 may have different line width. For instance, the plurality of driving lines 175 may have greater line width as they are connected to the light source module disposed farther away from the input pad unit 180. In this case, deviation between the driving signals inputted to the light source modules may decrease. Such a structure will be described in detail with reference to FIG. 4.

Figure 4:
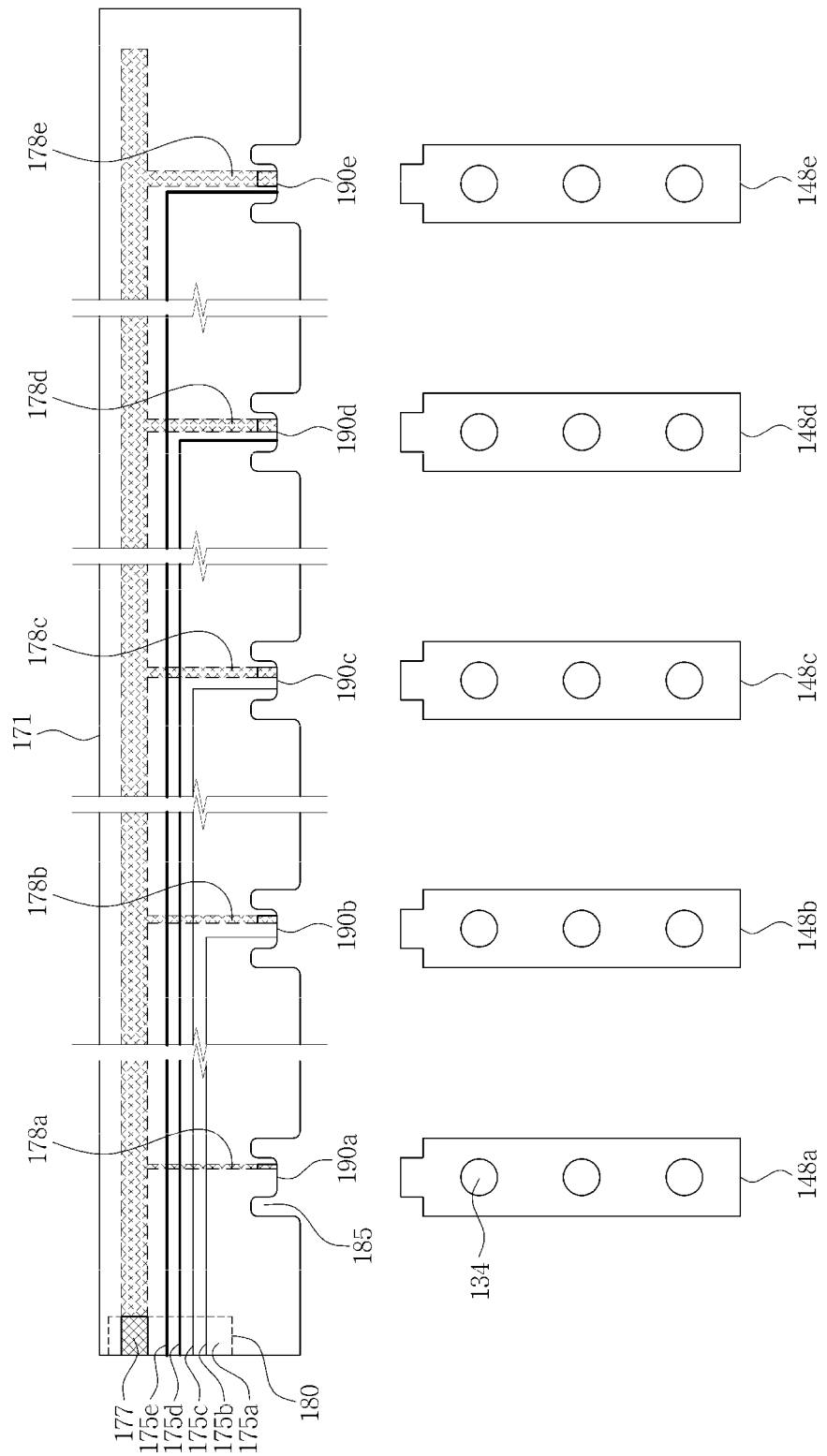
FIG. 4 is an enlarged view illustrating the first signal transmission unit of FIG. 3.

FIG. 4 is an enlarged view illustrating the first signal transmission unit 171 of FIG. 3.

First, the output pad units 190, sequentially from the one closest to the input pad unit 180, may be defined as a first output pad unit 190a, a second output pad unit 190b, a third output pad unit 190c, a fourth output pad unit 190d, and a fifth output pad unit 190e. Then, the driving line 175 of which another end portion is disposed on the first output pad unit 190a is defined as a first driving line 175a, the driving line 175 of which another end portion is disposed on the second output pad unit 190b is defined as a second driving line 175b, the driving line 175 of which another end portion is disposed on the third output pad unit 190c is defined as a third driving line 175c, the driving line 175 of which another end portion is disposed on the fourth output pad unit 190d is defined as a fourth driving line 175d, and the driving line 175 of which another end portion is disposed on the fifth output pad unit 190e is defined as a fifth driving line 175d, respectively.

Also, the light source modules of the first group are defined as follows: the light source module 148 connected to the first output pad unit 190a is defined as a first light source module 148a, the light source module 148 connected to the second output pad unit 190b is defined as a second light source module 148b, the light source module 148 connected to the third output pad unit 190c is defined as a third light source module 148c; the light source module 148 connected to the forth output pad unit 190d is defined as a fourth light source module 148d; and the light source module 148 connected to the fifth output pad unit 190e is defined as a fifth light source module 148e.

In this case, the first driving line 175a connected to the first light source module 148a which is the closest to the input pad unit 180 may have the smallest line width. On the other hand, the fifth driving line 175e connected to the fifth light source module 148e which is disposed the farthest from the input pad unit 180 may have the greatest line width. Also, the second driving line 175b may have a greater line width than the first driving line 175a, the third driving line 175c may have a greater line width than the second driving line 175b, and the fourth driving line 175d may have a greater line width than the third driving line 175c.

Meanwhile, the plurality of branch lines 178 may have different line widths from each other. The detailed description in this regard will follow.

First, the branch line 178 of which an end portion is disposed on the first output pad unit 190a is defined as a first branch line 178a; the branch line 178 of which an end portion is disposed on the second output pad unit 190b is defined as a second branch line 178b; the branch line 178 of which an end portion is disposed on the third output pad unit 190c is defined as a third branch line 178c; the branch line 178 of which an end portion is disposed on the fourth output pad unit 190d is defined as a fourth branch line 178d; and the branch line 178 of which an end portion is disposed on the fifth output pad unit 190e is defined as a fifth branch line 178e.

In this case, the first branch line 178a connected to the first light source module 148a which is the closest to the input pad unit 180 has the smallest line width. On the other hand, the fifth branch line 178e connected to the fifth light source module 148e which is disposed the farthest from the input pad unit 180 has the greatest line width. Also, the second branch line 178b has a greater line width than the first branch line 178a; the third branch line 178c has a greater line width than the second branch line 178b; and the fourth branch line 178d has a greater line width than the third branch line 178c.

Meanwhile, the second signal transmission unit 172 has practically the same configuration as the first signal transmission unit 171; thus, detailed configuration of the second signal transmission unit 172 will make reference to the above FIGS. 1, 3, 4 and the related description.

Figure 5:
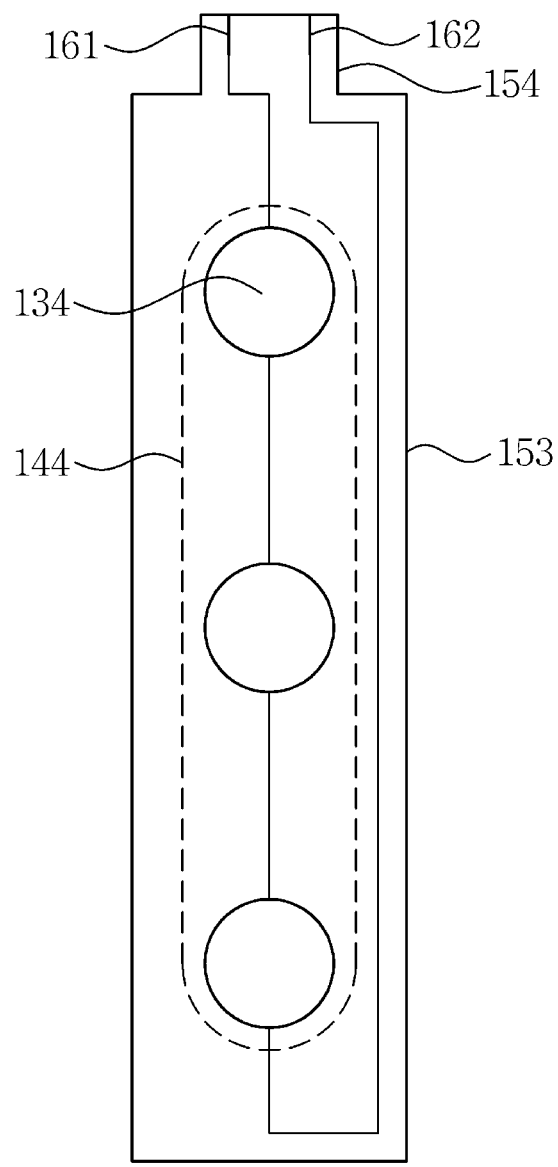
FIG. 5 is a detailed configuration view illustrating a light source module illustrated in FIG. 1.
Figure 6:
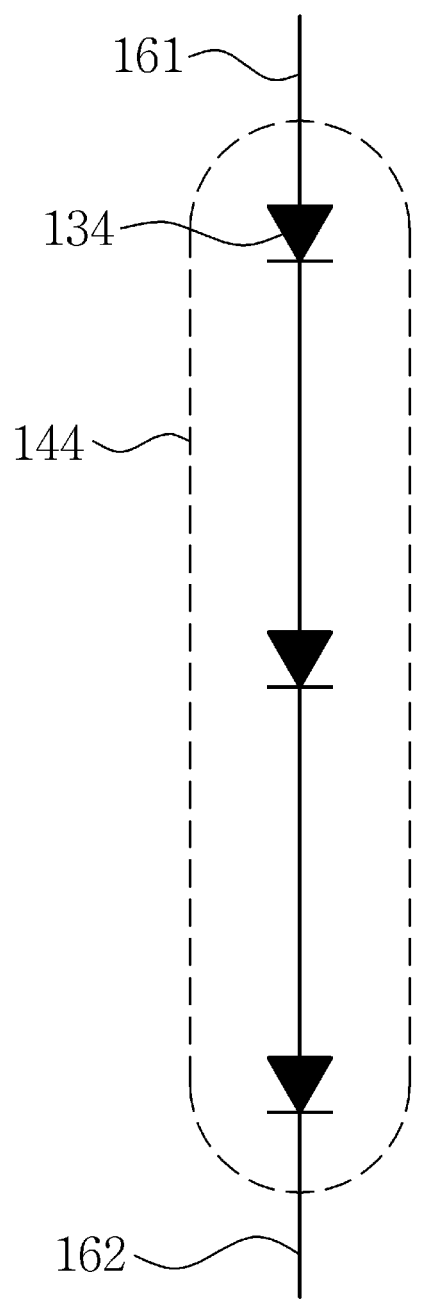
FIG. 6 is an equivalent circuit diagram illustrating a light source array of FIG. 5.

FIG. 5 is a detailed configuration view illustrating a light source module illustrated in FIG. 1. FIG. 6 is an equivalent circuit diagram illustrating a light source array of FIG. 5.

The light source module 148 may include, as illustrated in FIG. 5, a light source array 144, a first transmission line 161, a second transmission line 162, a pad unit 154, and a body unit 153.

The light source array 144 may include at least one light source 134 configured to emit light. The light source 134 may be a light emission package including at least one LED. In some embodiments, one light emission package may include a red LED emitting red light, a green LED emitting green light, and a blue LED emitting blue light therein. The light emission package may combine light of three colors to produce white light. In some embodiments, the light emission package may include only a blue LED therein among the above-described LEDs of three colors. In this case, fluorescent members (e.g., phosphors) may be formed in a light emitting unit of the blue LED so as to convert blue light into white light.

The light source array 144 may include, as illustrated in FIG. 6, a plurality of LEDs 134 connected to each other in series between the first transmission line 161 and the second transmission line 162.

The first transmission line 161 may supply a driving signal applied from one of the output pad units 190 to one side of the light source array 144. For example, the first transmission line 161 disposed in the first light source module 148a of FIG. 4 may supply a driving signal applied to the first output pad unit 190a to one side of the light source array 144.

The second transmission line 162 may supply a base signal applied from one of the output pad units 190 to another side of the light source array 144. For example, the second transmission line 162 disposed in the first light source module 148a of FIG. 4 may supply a base signal applied to the first output pad unit 190a to another side of the light source array 144.

An end portion of the first transmission line 161 and an end portion of the second transmission line 162 may be disposed on the pad unit 154. Also, the other portion of the first and second transmission lines 161 and 162 excluding an end portion of the first transmission line 161 and that of the second transmission line 162, and the light source array 144 may be disposed on the body unit 153.

The pad unit 154 and the body unit 153 may be integrally formed. The pad unit 154 and the body unit 153 may include a PCB (Printed Circuit Board).

Meanwhile, although not illustrated, the light source modules 148a, 148b, 148c, 148d, and 148e may be connected to one another in series. In this case, the light source modules 148a, 148b, 148c, 148d, and 148e may be connected between a single driving line and the base line 177. In this case, the single driving line may be connected to the first light source module 148a which is disposed the most adjacent to the input pad unit 180, and the base line 177 may be connected to the fifth light source module 148e which is disposed the most farthest from the input pad unit 180. For example, the single driving line may be connected to the first transmission line 161 of the first light source module 148a, and the second transmission line 162 of the first light source module 148a may be connected to the first transmission line 161 of the second light source module 148b through a first connection line. Herein, the first connection line may be disposed in the first signal transmission unit 171. Likewise, the second transmission line 162 of the second light source module 148b may be connected to the first transmission line 161 of the third light source module 148c through a second connection line of the first signal transmission unit 171. In such a manner, the second transmission line 162 and the first transmission line 161 of adjacent light source modules may be connected to each other through a corresponding connection line. However, the second transmission line 162 of the fifth light source module 148e may be connected to the base line 177. Meanwhile, the single driving line may not be connected to the other light source modules 148b, 148c, 148d, and 148e, except for the first light source module 148a, and the base line 177 may not be connected to the other light source modules 148a, 148b, 148c, and 148d, except for the fifth light source module 148e. In such a structure, the aforementioned connection lines may each have the same line width. Further, the first transmission lines 161 of each of the light source modules 148a, 148b, 148c, 148d, and 148e may have the same line width, and the second transmission lines 162 of each of the light source modules 148a, 148b, 148c, 148d, and 148e may have the same line width. Further, the first transmission line 161 and the second transmission line 162 may have the same line width.

Figure 7:
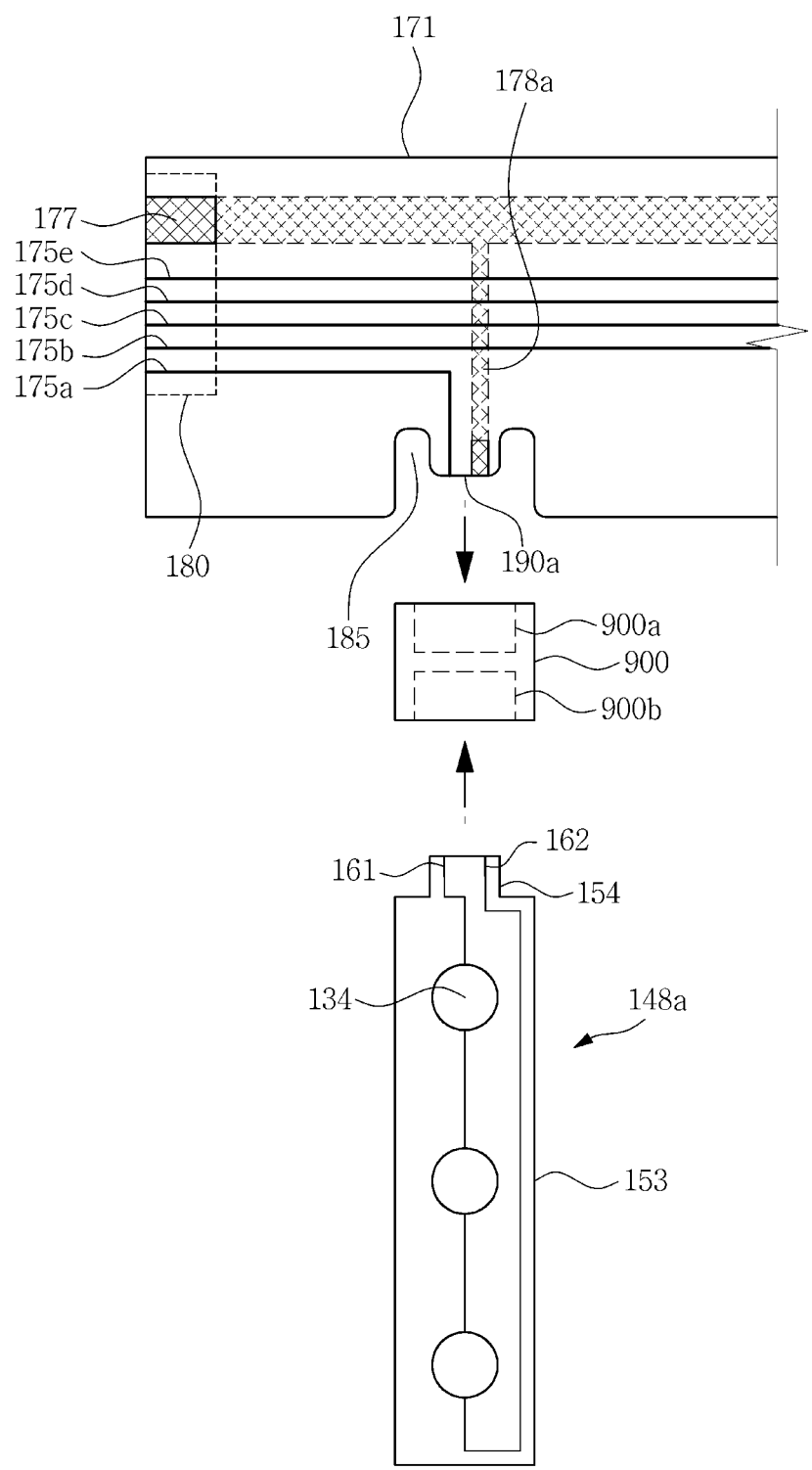
FIG. 7 is a view illustrating a method of connecting the first signal transmission unit and the first light source module of FIG. 4.

FIG. 7 is a view illustrating a method of connecting the first signal transmission unit 171 and the first light source module 148a of FIG. 4.

As illustrated in FIG. 7, the first signal transmission unit 171 and the first light source module 148a may be connected to each other using a connector 900. Herein, the connector 900 refers to a two-way connector and may include, as illustrated in FIG. 7, a first connecting groove 900a to which the first output pad unit 190a of the first signal transmission unit 171 is inserted and a second connecting groove 900b to which the pad unit 154 of the first light source module 148a is inserted. Although not illustrated, the first connection groove 900a and the second connection groove 900b may include therein a first connection terminal configured to connect the first driving line 175a and the first transmission line 161, and a second connection terminal configured to connect the first branch line 178a and the second transmission line 162.

When the first output pad unit 190a of the first signal transmission unit 171 and the connector 900 are connected to each other, edge portions of both sides of the connector 900 may be inserted to inserting holes 185 formed on both sides of the first output pad unit 190a.

Meanwhile, although not illustrated, the other output pad units and the other light source modules provided on the first signal transmission unit 171 may be also connected to each other using other connectors having the same structure illustrated in FIG. 7.

Meanwhile, the second signal transmission unit 172 and the light source modules of the second group may be connected to each other using other connectors having the same structure illustrated in FIG. 7.

Figure 8:
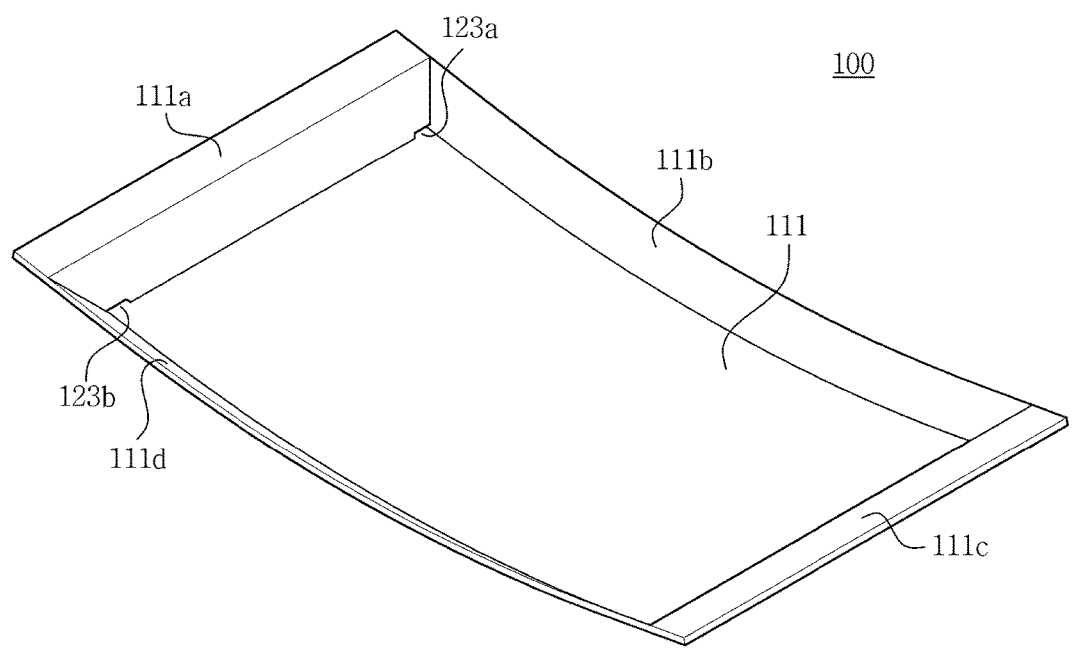
FIG. 8 is a detailed configuration view illustrating a bottom case of FIG. 1.

FIG. 8 is a detailed configuration view illustrating a bottom case of FIG. 1.

As illustrated in FIG. 8, the bottom case 100 may further have at least one connecting hole 123a and 123b. Referring to FIG. 8, the connecting holes 123a and 123b may be formed on both sides of the first side 111a.

The input pad unit 180 of the first signal transmission unit 171 may be exposed outwards through the first connecting hole 123a. The input pad unit 180 of the first signal transmission unit 171 may be connected to a first flexible flat cable (not shown). The first flexible flat cable may connect the input pad unit 180 of the first signal transmission unit 171 and the power supply, thereby transmitting the driving signals applied from the power supply to the input pad unit 180 of the first signal transmission unit 171. An input connector may be provided in the input pad unit 180 of the first signal transmission unit 171. The input connector may be connected to an output connector of the first flexible flat cable.

The input pad unit of the second signal transmission unit 172 may be exposed outwards through the second connecting hole 123b. The input pad unit of the second signal transmission unit 172 may be connected to the second flexible flat cable (not shown). The second flexible flat cable may connect the input pad unit of the second signal transmission unit 172 and the power supply, thereby transmitting driving signals applied from the power supply to the input pad unit 180 of the second signal transmission unit 172. An input connector may be provided on the input pad unit 180 of the second signal transmission unit 172. The input connector may be connected to an output connector of the second flexible flat cable.

Meanwhile, the position of the first and second connecting holes 123a and 123b may vary according to the position of the input pad unit of the first and second signal transmission units 171 and 172. For example, when the input pad unit 180 of the first signal transmission unit 171 is disposed in the center portion of the first signal transmission unit 171, the first connecting hole 123a may be formed in the center portion of the second side portion 111b.

The first transmission line 161 has a plurality of first transmission lines, a first transmission line 161 farther away from the input pad unit 180 has a greater line width than that close to the input pad unit 180.

It will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:
1. A display device comprising:
a curved display panel;
at least one light source module configured to provide light to the display panel;
a bottom case configured to accommodate the light source module; and
at least one signal transmission unit connected to an end portion of the light source module, the signal transmission unit comprising at least one driving line transmitting a driving signal to the light source module and at least one base line transmitting a base signal,
wherein the signal transmission unit includes an input pad unit connected to an end portion of the driving line and an end portion of the base line, and configured to receive a driving signal outputted from a power supply, and an output pad unit connected to another end portion of the driving line and another end portion of the base line, an end portion of a branch line branching off from the base line, and wherein the branch line includes a plurality of branch lines, a branch line farther away from the input pad unit has a greater line width than that close to the input pad unit.

2. The display device of claim 1, wherein the signal transmission unit is a flexible printed circuit.

3. The display device of claim 1, wherein the signal transmission unit further comprises an insulating layer between the driving line and the branch line.

4. The display device of claim 1, wherein the signal transmission unit further comprises a connector configured to connect the output pad unit and the light source module.

5. The display device of claim 1, wherein the driving line has a plurality of driving lines, a driving line farther away from the input pad unit has a greater line width than that close to the input pad unit.

6. The display device of claim 1, wherein the bottom case has a connecting hole through which the input pad unit of the signal transmission unit is exposed.

7. The display device of claim 1, wherein the bottom case has a connecting hole through which the input pad unit of the signal transmission unit is exposed.

8. The display device of claim 1, wherein each of the light source modules comprises:
   a light source array comprising at least one light source configured to emit light;
   a first transmission line configured to supply a driving signal applied from one of the output pad units to one side of the light source array;
   a second transmission line configured to supply a base signal applied from one of the output pad units to another side of the light source array;
   a pad unit on which an end portion of the first transmission line and an end portion of the second transmission line are disposed; and
   a body unit on which a remaining portion of the first and second transmission lines, excluding the end portion of the first transmission line and the end portion of the second transmission line, and the light source array are disposed.

9. The display device of claim 8, wherein the first transmission line has a plurality of first transmission lines, a transmission line farther away from the input pad unit has a greater line width than that close to the input pad unit.

10. The display device of claim 9, wherein the bottom case has a connecting hole through which the input pad unit of the signal transmission unit is exposed.

11. The display device of claim 1, wherein the signal transmission unit is disposed between the light source modules and one side portion of the bottom case.

12. The display device of claim 11, wherein the signal transmission unit is attached to a base portion of the bottom case.

13. The display device of claim 12, further comprising an adhesive member disposed between the signal transmission unit and the base portion of the bottom case.

14. The display device of claim 1, wherein the bottom case has a connecting hole through which the input pad unit of the signal transmission unit is exposed.

15. The display device of claim 1, wherein the plurality of driving lines and the at least one base line are disposed on a same layer in the signal transmission unit.

16. The display device of claim 8, wherein the plurality of light source modules comprise the first transmission lines having a same width or the second transmission lines having a same width.

* * * * *